United States Patent [19]

Brown, III et al.

[11] Patent Number: 4,993,853

[45] Date of Patent: Feb. 19, 1991

[54] MATRIX CHARACTER MODIFICATION INFORMATION UNIQUE TO A GIVEN FONT

[75] Inventors: John K. Brown, III; Joseph P. Kolb; Lynn M. Olivers; Mark A. Robb; Stephen R. Troyer, all of Lexington, Ky.

[73] Assignee: International Business Machines Corporation, Armonk, N.Y.

[21] Appl. No.: 392,675

[22] Filed: Aug. 11, 1989

[51] Int. Cl.$^5$ .............................................. B41J 2/485
[52] U.S. Cl. ..................................... 400/121; 400/304
[58] Field of Search ............... 400/121, 210, 303–306; 340/729, 731, 735, 744, 790

[56] References Cited

U.S. PATENT DOCUMENTS

| | | | |
|---|---|---|---|
| 3,896,428 | 7/1975 | Williams | 340/324 AD |
| 4,488,827 | 12/1984 | Haganuma | 400/121 |
| 4,586,835 | 5/1986 | Alexander | 340/735 |
| 4,646,077 | 2/1987 | Culley | 340/735 |
| 4,741,634 | 5/1988 | Nozaki | 400/306 |
| 4,780,006 | 10/1988 | Hamano | 400/121 |
| 4,827,254 | 5/1989 | Nishiyama | 340/790 |

FOREIGN PATENT DOCUMENTS

| | | | |
|---|---|---|---|
| 278051 | 12/1987 | Japan | 400/121 |
| 242560 | 10/1988 | Japan | 400/121 |
| 67356 | 3/1989 | Japan | 400/304 |

OTHER PUBLICATIONS

IBM Technical Disclosure Bulletin article entitled "Energy Management For An electronic Font Used In A Resistive Ribbon Printer" vol. 30, No. 5, Oct. 1987 at pp. 254–255.

Primary Examiner—David A. Wiecking
Assistant Examiner—Steven S. Kelley
Attorney, Agent, or Firm—John A. Brady

[57] ABSTRACT

A matrix printer (1) or other imaging device in a memory (7) stores fonts of character data (11, 11') in defining bit maps for each character of the fonts. The memory also stores shift values for each font which vary with the nature of the font for double strike, emphasize, and combined double strike and emphasize, from which character bit maps are modified before printing by being shifted and overlayed. Improved images for double strike and emphasize are achieved, and the combined double strike and emphasize need not be the overlay of double strike and emphasize.

5 Claims, 4 Drawing Sheets

FIG. 1 PRIOR ART

NORMAL:

A B C D E F G H I J K L M N O P Q R S

DOUBLE STRIKE:

A B C D E F G H I J K L M N O P Q R S

DOUBLE STRIKE/EMPHASIZED:

A B C D E F G H I J K L M N O P Q R S

EMPHASIZED:

NORMAL:

A B C D E F G H I J K L M N O P Q R S T

DOUBLE STRIKE:

A B C D E F G H I J K L M N O P Q R S T

DOUBLE STRIKE/EMPHASIZED:

A B C D E F G H I J K L M N O P Q R S T

EMPHASIZED:

NORMAL:

A B C D E F G H I J K L M N O P Q R S T U V W X Y Z ˜ % @ #

DOUBLE STRIKE:

A B C D E F G H I J K L M N O P Q R S T U V W X Y Z ˜ % @ #

DOUBLE STRIKE/EMPHASIZED:

A B C D E F G H I J K L M N O P Q R S T U V W X Y Z ˜ % @ #

EMPHASIZED:

NORMAL:

A B C D E F G H I J K L M N O P Q R S T U V W X Y Z ˜ % @ #

DOUBLE STRIKE:

A B C D E F G H I J K L M N O P Q R S T U V W X Y Z ˜ % @ #

DOUBLE STRIKE/EMPHASIZED:

A B C D E F G H I J K L M N O P Q R S T U V W X Y Z ˜ % @ #

EMPHASIZED:

NORMAL:

ABCDEFGHIJKLMNOPQRSTUVWXYZ ‾ % @ #

DOUBLE STRIKE:

ABCDEFGHIJKLMNOPQRSTUVWXYZ ‾ % @ #

DOUBLE STRIKE/EMPHASIZED:

ABCDEFGHIJKLMNOPQRSTUVWXYZ ‾ % @ #

EMPHASIZED:

ABCDEFGHIJKLMNOPQRSTUVWXYZ ‾ % @ #

MATRIX CHARACTER MODIFICATION INFORMATION UNIQUE TO A GIVEN FONT

TECHNICAL FIELD

Matrix imaging devices or printers are known which provide the capability of printing in slightly enlarged form, often called double strike and emphasize, and often including combined double strike and emphasize. Double strike typically refers to vertical widening and emphasize typically refers to horizontal widening. The enlargement is typically defined from the bit map of a standard font employing an algorithm, such as double strike being the standard character and the standard character displaced vertically two pels. This invention provides an imaging device in which various font modifications are obtained by algorithm in improved visual form.

BACKGROUND OF THE INVENTION

Double strike and emphasize are believed to be supported in existing printers by defining the bit map of each character as the overlay of the bit map image of the standard character and that bit map image offset from the first image. For double strike the second image is shifted vertically, and for emphasize the shift of the second image is horizontal. For combined double strike and emphasize the character image bit map is the result of the standard image and the two shifted images as shifted for double strike and emphasize. When the image is printed, a single dot or pel (a standard term believed derived from the phrase "picture element") is printed once at each bit position in which one of the bit maps as so combined defines a dot to be printed.

Typically, the shift of the bit maps for double strike and for emphasize is two pel positions, and the final bit map is obtained from that of the standard character by a digital data processor employing an algorithm to determine the result of such shifting. In accordance with this invention the expanded characters are obtained by an algorithm, but the offsets are not necessarily just horizontal or just vertical or just their direct combination. This is achieved by including modification information in the data stored for each standard font. The expansion of characters is then defined for each character of each font by the modification information of that font, which will be different for fonts having different visual characteristics.

U.S. Pat. No. 3,896,424 to Williams discloses a display apparatus of the video type in which a preceding code character defines the attributes of the display of characters following that code. At column 7 several attributes called out by the code, such as strike out, underline, and double wide, are discussed. An attribute unique to the type style is not suggested.

*IBM Technical Disclosure Bulletin* article entitled "Energy Management for an Electronic Font Used in a Resistive Ribbon Printer, " Vol. 30, No. 5, October 1987 at pp. 254–255 is illustrative of known prior art in which a code is associated with each character defining the bit density of the character, to which a thermal printer reacts by changing the heat applied to the bits of each character as the character is printed.

DISCLOSURE OF THE INVENTION

In a matrix imaging device or printer operating to replicate bit-mapped fonts improved imaging is achieved by including a modification instruction for each font or type style. This modification instruction defines the overlay of the bit maps for each character in the font. The modification instruction varies with the nature of the font. Thus, certain fonts have very thin lines such that an overlay of character bit maps shifted two pels would produce a blurred outline or voids. In such a case, the modification instruction would specify a one pel shift, possibly both horizontally for emphasize and vertically for double strike. A very thick font might be improved by both double strike and emphasize being shifted by three pels.

Combined double strike and emphasize need not be the overlay of double strike and emphasize. Instead, a very thick font might be defined by the modification of a two pel vertical shift and a three pel horizontal shift, while both double strike alone and emphasize alone employ three pel shifts.

BRIEF DESCRIPTION OF THE DRAWING

The details of this invention will be described in connection with the accompanying drawing, in which FIG. 1 illustrates a 30 point, font having thin lines with double strike, emphasize and combined double strike and emphasize based on a three-pel-shift overlay of the character bit maps;

FIG. 2 shows the font of FIG. 1 in standard form and modified in accordance with this invention;

FIG. 3 shows the same font style as that of FIG. 1 in 14 point in standard form and modified in accordance with this invention;

FIG. 4 shows font styles of heavy, block characters in 14 point in standard form and modified in accordance with this invention; and FIG. 5 shows a cursive font style in 14 point in standard form and modified in accordance with this invention.

BEST MODE FOR CARRYING OUT THE INVENTION

Figure 6:
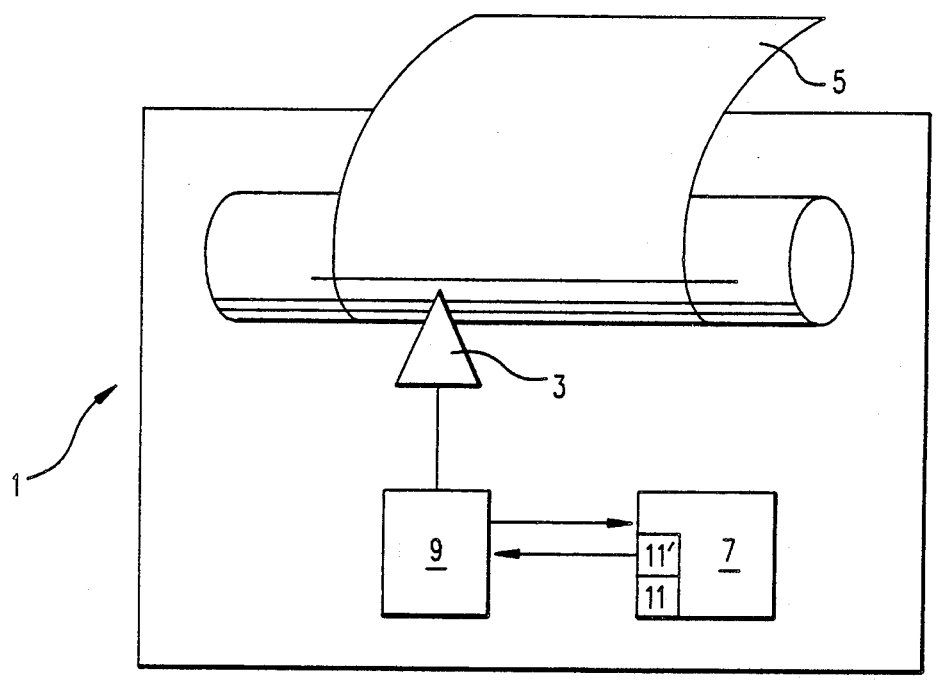
FIG. 6 is a block diagram illustrative of a printer operative in accordance with this invention.

In accordance with this invention the overlay of the standard character image with itself to define pel positions are not necessarily just vertical for double strike and just horizontal for emphasize. For example, the offsets for double strike can be two pels vertical and one pel horizontal. For emphasize it can be one pel vertical and three pels horizontal. The combined double strike and emphasize mode can be a different overlay from that which would result from overlaying the double strike and emphasize bit maps.

These advantages are achieved by having six control values stored with each font. These values are indicative of double strike shift vertical, double strike shift horizontal, emphasize shift vertical, emphasize shift horizontal, double strike combined with emphasize shift vertical and double strike combined with emphasize shift horizontal. This requires six bytes of storage for each font, a negligible increase in required storage.

The control values are individually selected for each font to coordinate the final, printed image with the typestyle characteristics and point size to be modified. Determination of the best values for each font requires font design judgement generally based on an intuitive modification followed by the study of print samples, and then followed by modifications based on the print sample. Quality of the modified characters can be improved dramatically in some cases by using such control information.

FIG. 1 shows a font style with narrow vertical lines with an overlay shifted three pels vertically for double strike, three pels horizontally for emphasize, and three pels both vertically and horizontally for double strike combined with emphasize. Blurred lines and voids at the narrow lines are apparent. The same font in FIG. 2 is modified by double strike being 2 vertical and 0 horizontal, emphasize being 0 vertical and 2 horizontal and double strike combined with emphasize being 2 vertical and 2 horizontal. The clear images are apparent.

The font of FIG. 3 is the same style as the font of FIG. 2 in 14 point, which is a very thin stroke font. It is modified by double strike being 2 vertical and 0 horizontal, emphasize being 0 vertical and 1 horizontal, and double strike combined with emphasize being 2 vertical and 1 horizontal. The clear images are apparent.

The font of FIG. 4 is a very thick stroke font. It is modified by double strike being 3 vertical and 0 horizontal, emphasize being 0 vertical and 3 horizontal, and double strike combined with emphasize being 2 vertical and 3 horizontal. The strong, clear images are apparent. Thus, the fonts of FIG. 3 and FIG. 4, although in the same point size, are improved by significantly different control valves.

The bold cursive font of FIG. 5 consists of varying line weight curves for which modification is very difficult to define without producing undesirable open voids in the characters. The excellent results are achieved by double strike being 2 vertical and 0 horizontal, emphasize being 2 vertical and 1 horizontal, and combined double strike and emphasize being 1 vertical and 2 horizontal.

These advantage can be particularly apparent for fonts which can have large variations between the thickness of horizontal and vertical lines and which are in many different point sizes, which is true of many fonts used in commercial printing, termed typographic fonts.

Since modification in each case involves the possibility of both horizontal and vertical shifts in overlaying the standard font with itself, a general algorithm providing for both shifts preferably would be used and there would be no added delay to compute double strike combined with emphasize.

FIG. 6 illustrates a printer 1 embodying this invention. Imaging may be by any technology in which the image is defined with a bit pattern, which might be a laser printer. The printhead 3 operates on paper 5 to form a final image. Each font is embedded in electronic memory 7 as a binary pattern, normally arbitrarily denominated ones for one predetermined state and zero for a second electronic state. A central processing unit or microcomputer 9 retrieves the font data and operates on it to prepare it for imaging by printhead 3. In accordance with this invention, each font in electronic memory has stored data 11, also in binary form, of the modification information as described in the foregoing which is applicable to the entire font. Microcomputer 9 is programmed to first access stored data 11 when a modification is made and to follow the shifting defined by that stored data in modifying all of the several characters of the font. Where several fonts are stored in memory 7, different data 11' is associated with each font. Similarly, memory 7 may not be permanent or embedded, or may be in a memory cartridge which is plugged in and removed so that another cartridge can be plugged in.

The algorithm to obtain a bit pattern from the image of a character stored in memory 7 and that image shifted horizontally and vertically as described may be implemented by straightforward programming which forms no part of this invention and therefore will not be described in detail.

Modifications within the spirit ad scope of this invention are anticipated. The imaging could be temporary, as by cathode ray tube (CRT) display or for special purposes, such as typesetting. Coverage is sought as provided by law, with particular reference to the accompanying claims.

We claim:

1. Imaging apparatus comprising means for forming images of characters in response to a bit image pattern, means for storing bit image patterns of a font of characters, bit image processing means for modifying bit image patterns of characters by shifting original bit images and determining a bit image pattern of the combination of said original image and said shifted image for imaging by said means for forming images, and means for storing coded information unique to said font defining said shifting for said font.

2. The imaging apparatus as in claim 1 in which said bit image processing means modifies said bit image patterns by shifting said original bit images vertically and horizontally in amounts defined by said coded information.

3. The imaging apparatus as in claim 2 in which said coded information defines at least three of said modifications by defining three sets of vertical and horizontal amounts of shifting of said original bit images.

4. A printer comprising imaging means for forming characters in response to a bit image pattern, means for storing bit image patterns of a font of characters and modification information unique to said font applicable to all characters of said font, said modification information defining at least one set of amounts of horizontal and vertical shifts, bit image processing means for modifying bit image patterns of characters by shifting original bit images an amount defined by said modification information unique to said font.

5. The printer as in claim 4 in which said modification information defines at least three sets of amounts of horizontal and vertical shifts.

* * * * *